C. G. OLSON.
MACHINE TOOL.
APPLICATION FILED DEC. 23, 1918.
1,378,370.
Patented May 17, 1921.
4 SHEETS—SHEET 2.
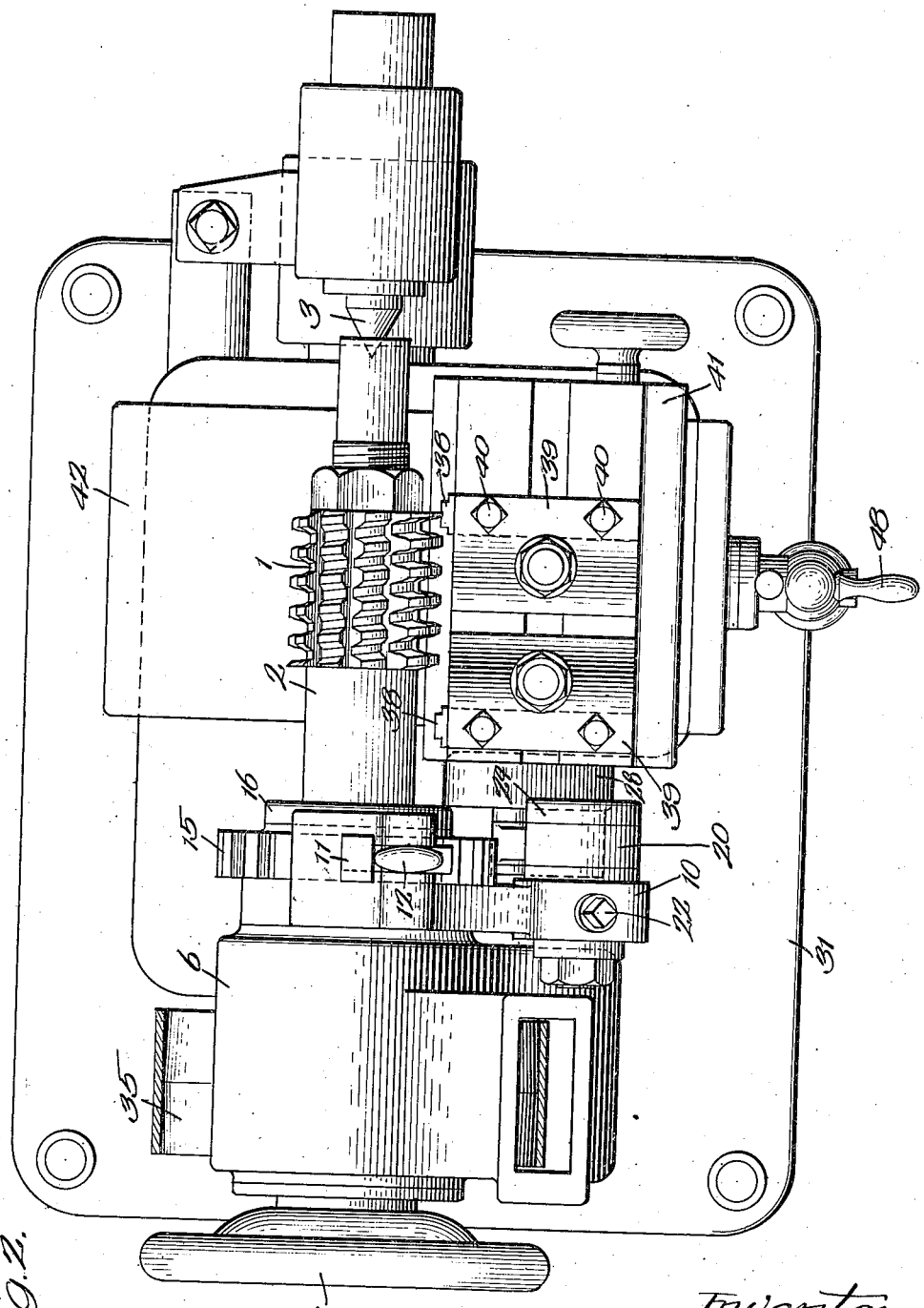

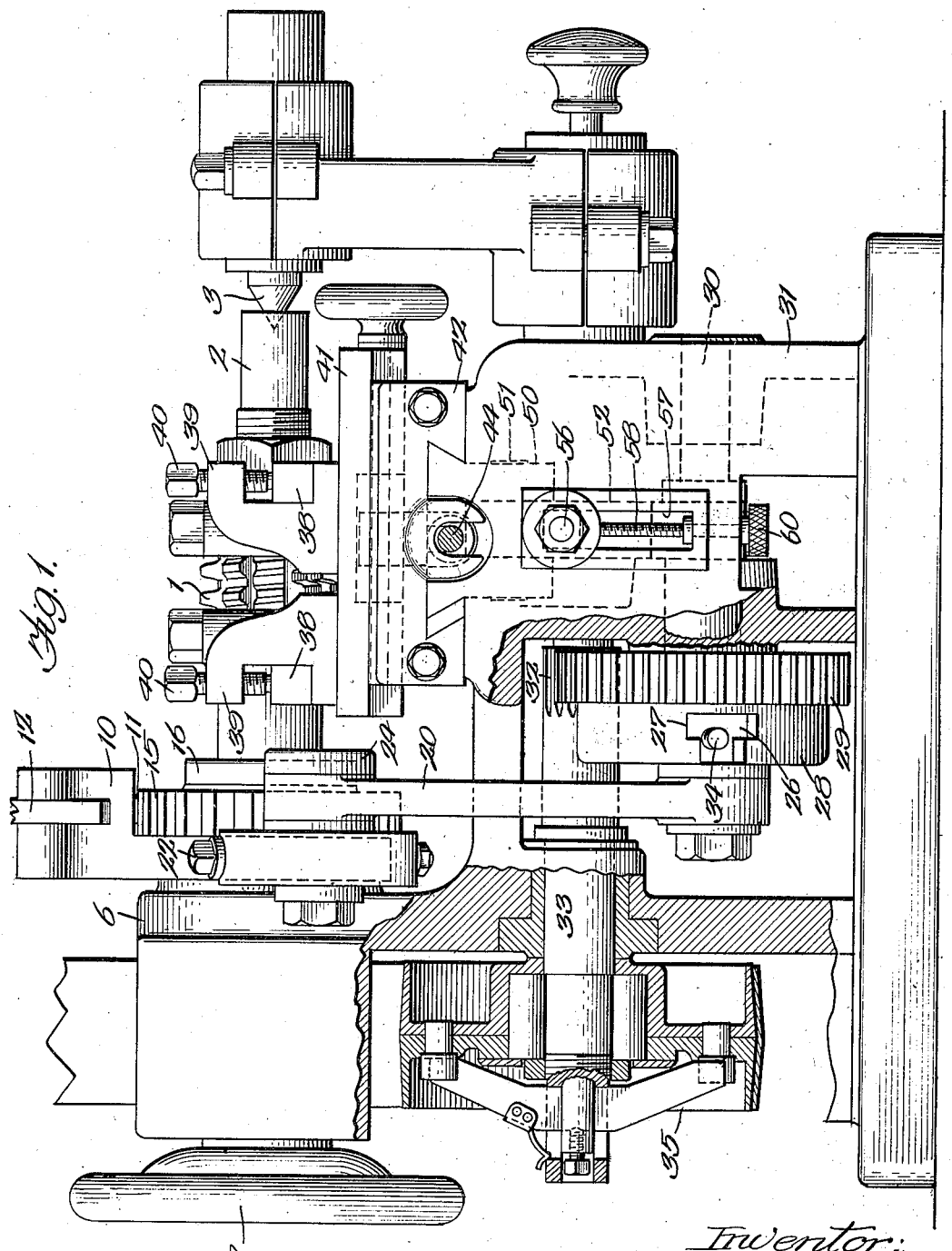

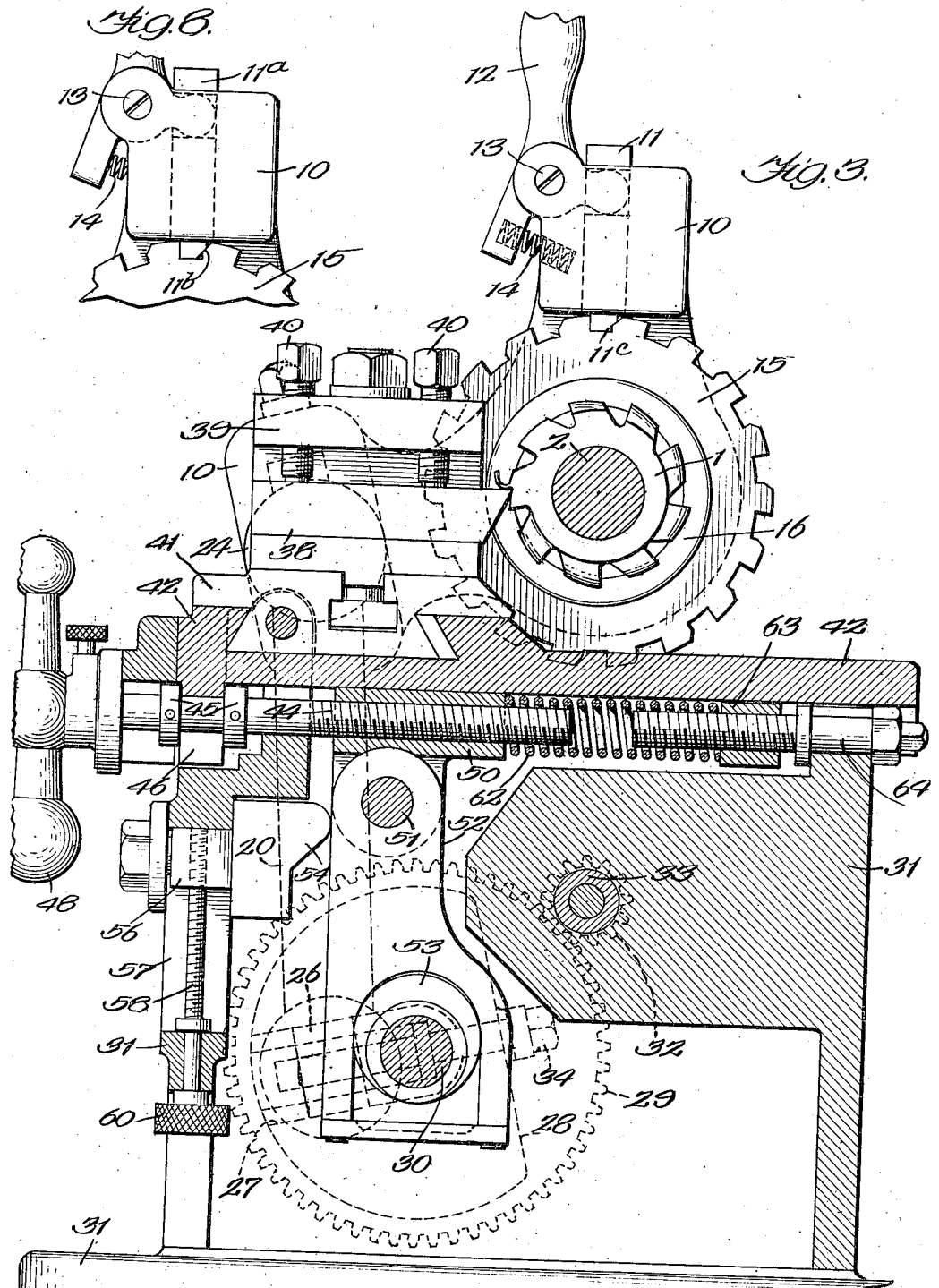

C. G. OLSON.
MACHINE TOOL.
APPLICATION FILED DEC. 23, 1918.

1,378,370.

Patented May 17, 1921
4 SHEETS—SHEET 4.

Inventor:
Carl G. Olson.
By Cheever & Cox
Attys

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

MACHINE-TOOL.

1,378,370.     Specification of Letters Patent.     Patented May 17, 1921.

Application filed December 23, 1918. Serial No. 268,013.

*To all whom it may concern:*

Be it known that I, CARL G. OLSON, a citizen of the United States, residing at Chicago, in the county of Cook and State of Illinois, have invented a certain new and useful Improvement in Machine-Tools, of which the following is a specification.

My invention relates to machine tools and the general object of the invention is to provide means for automatically taking a spiral cut. I employ the term "spiral" not as synonymous with helical, but in the sense that the cut is eccentric to the axis of the work, and the finish of the cut is closer to the axis than the beginning. My machine is similar in some respects to a lathe but has an automatic relieving mechanism so that the tool moves inward toward the work while the cut is being taken and automatically recedes after the cut is finished. One of the uses to which my machine is particularly well adapted is that of cutting off the end teeth of hobs. It will be understood that, owing to the fact that the teeth of hobs are arranged helically, some of the teeth at the ends will be incomplete. They will be of only partial width and hence lack the strength of full teeth and would be apt to be broken off in service. It has been customary to remove them by chipping and filing, which is a very slow operation. My machine is especially adapted to cut off these partial end teeth, its general characteristic being to impart an oscillatory movement to the hob, and a reciprocatory movement of the tool. In the form illustrated in the accompanying drawings the machine is adapted to entirely cut away one tooth before commencing to cut away the next one, and I have provided an index plate in the form of a circular plate having notches in its periphery, and a dog or pawl for causing the plate to move in unison with the oscillating actuator until a tooth has been completely cut away, after which the dog can be inserted into a fresh notch for causing the tool to remove the next tooth from the hob.

I obtain my objects by the mechanism illustrated in the accompanying drawings in which—

Figure 1 is a front elevation of the complete machine, certain portions being shown in vertical section.

Fig. 2 is a top plan view of the machine.

Fig. 3 is a transverse section.

Fig. 8 is a detail showing a modified form of pawl for giving a step by step rotary movement to the work.

Like numerals denote like parts throughout the several views.

Figure 5:
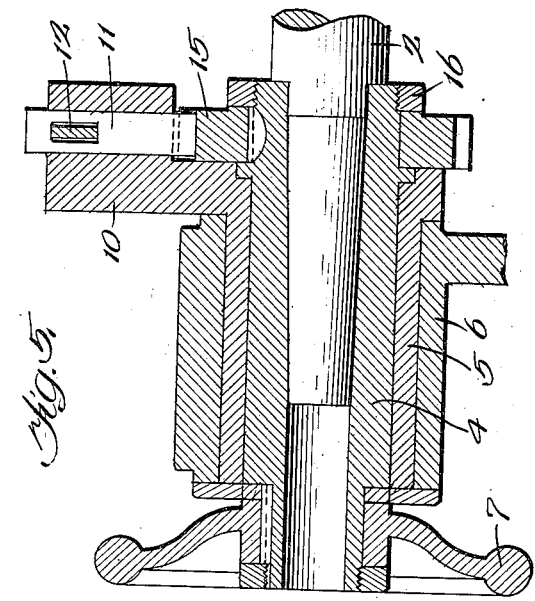
Fig. 5 is an axial section at the point of connection between the arbor and the spindle.

In the form of machine illustrated in the first seven figures of the drawings, the hob 1 is fastened to an arbor 2 which is supported at one end upon the tail stock center 3 and at the other end by the spindle 4. The spindle is journaled in a sleeve 5 supported in the stationary head stock 6 as shown in section in Fig. 5. The spindle and arbor, may be rotated by hand during the setting up operation by means of a hand wheel 7. Said sleeve 5 forms the hub or bearing of a rocker arm 10 in which a dog 11 is mounted so as to slide radially toward and from the axis of the spindle. The dog is controlled by a hand lever 12 fulcrumed upon a pin 13 carried by the rocker arm as shown in side elevation in Fig. 3. A spring 14 presses the hand lever in such direction as to depress the dog and hold it in engagement with the index plate 15. Said plate is keyed to the spindle and held in position on it by a screw collar 16, see especially Figs. 2 and 5. In the case illustrated, the index plate 15 is in the form of a notched templet so formed that the dog 11 will hold both when moving forward and backward. Thus a rocking or oscillatory movement is imparted to the work when the rocker arm 10 rocks, although it will be understood that by substituting the form of pawl shown in Fig. 8 a step by step rotation would be imparted to the work. The difference is that in the form shown in Fig. 8 the pawl 11$^a$ has a back surface 11$^b$ which slants all the way down whereas in the form of dog shown elsewhere in the drawings the back surface of the dog has a radial shoulder 11ᶜ which engages a corresponding portion of the notch in the index plate 15. Thus it will be seen that the back of the notches of the index plate are partly radial and partly oblique, and that as a result, by employing a pawl the back of which slants from top to bottom a step by step motion will be imparted to the index plate whereas by merely substituting a dog of the form shown in Fig. 3 and elsewhere the same index plate may be employed to obtain a rocking movement of the index plate.

The rocker arm 10 is oscillated by means of a link 20. A slot 21 is formed in said rocker arm as shown in detail, Fig. 7. A screw 22 passes lengthwise through the slot and works in a squared portion 23 of the pin 24 which connects the link to the rocker. Said slot extends approximately at right angles to the radius drawn from it to the axis of the rocker arm. At the lower end the link is articulately connected to a block 26 shown in dotted lines in Fig. 3. This block slides in the slot 27 formed radially in the hub 28 formed at the side of the gear wheel 29. Said gear wheel is rigidly fastened to the shaft 30 which is journaled in the main frame 31 of the machine. Said gear wheel is driven by a pinion 32 which is also journaled in the main frame as best shown at the left end of Fig. 1. Power is applied to shaft 33 by any suitable mechanism, which is here shown in the form of a clutch 35 which need not be described in detail.

From the foregoing it will be seen that when the shaft 33 is rotated it will actuate the link 20 and cause the rocker arm 10 to oscillate. The angular position of the rocker arm may be changed with respect to the link by rotating the cap screw 22 in the proper direction and the eccentricity of the connection between the hub 28 and the link 20 may be varied by rotating the screw 34 which controls the position of the block 26 in the slot 27.

The tools 38 are secured in the respective tool posts 39 by set screws 40. By preference these parts are duplicated as best shown in Figs. 1 and 2, the purpose being to enable the machine to remove teeth from either end of the hob. The tool posts are mounted upon a slide 41 carried by a cross carriage 42 which is slidingly mounted upon the main frame in such manner as to move transverse to the axis of the work.

Figures 4, 7:
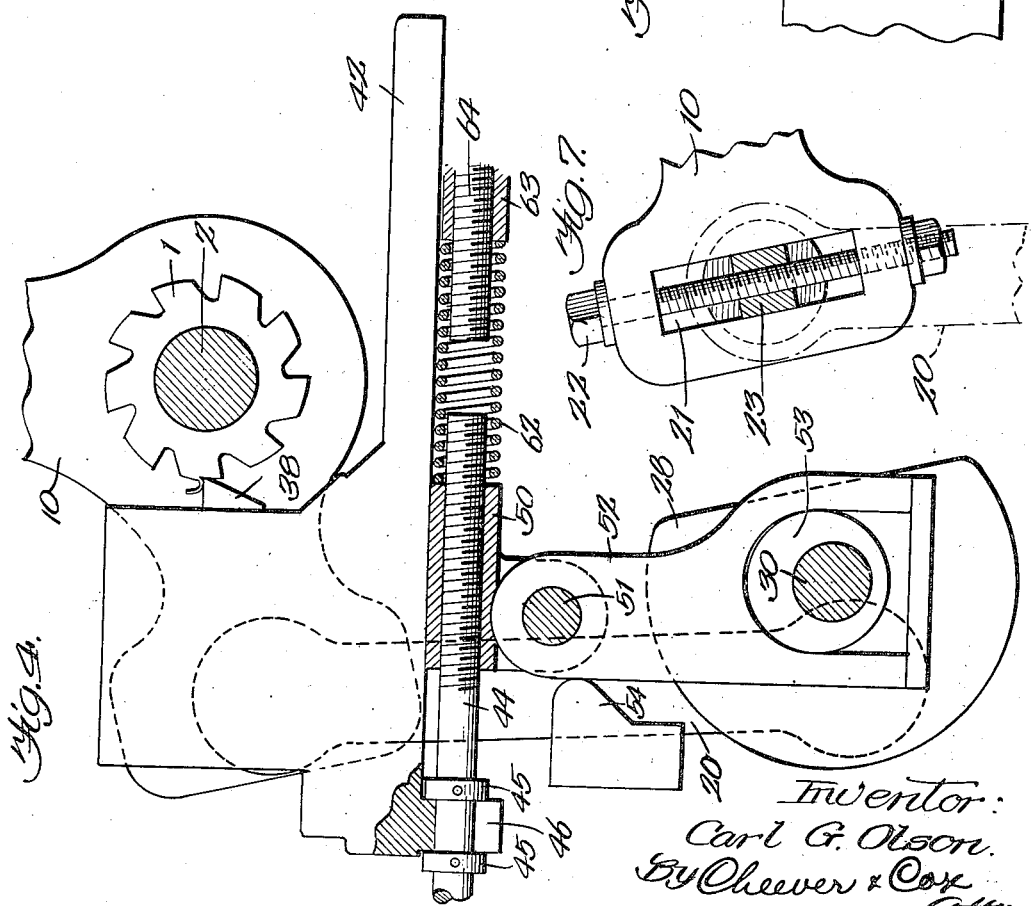
Fig. 4 is a section analogous to Fig. 3, but more or less diagrammatic in the sense that it omits some of the details so as to illustrate the principle of operation more plainly.
Fig. 7 is a detail of the connection between the oscillating arm and the link which actuates it.

The cross carriage is actuated by means of a feed screw 44 having two collars 45 which engage between them the depending yoke 46 which forms part of the cross carriage. The construction is such that the feed screw is free to rotate, but its movement longitudinally will control the position of the cross carriage. Said feed screw is rotated by a hand wheel 48. A nut 50, best shown in Figs. 3 and 4, is threaded to receive the feed screw. It carries a pin 51 by which it is articulately connected to the upper end of a lever 52. The lower end of this lever is bifurcated to receive the eccentric 53 fastened to shaft 30. A block 54 engages one side of lever 52 and constitutes a fulcrum for it. This fulcrum block has a squared portion 56 which slides in vertical ways 57 formed in the stationary framework of the machine. An adjusting screw 58 is mounted in the frame and controls the position of the portion 56. Said screw is rotated by means of a knurled wheel 60. The arrangement is such that when the shaft 30 rotates, the eccentric 53 causes the lever 52 to rock upon its fulcrum 53 and thereby move the cross carriage back and forth. The lever is held in contact with its fulcrum by a spring 62 one end of which abuts the nut 50 and the other end abuts a nut 63 carried by an adjusting screw 64. Said adjusting screw is journaled in the main frame and by rotating it in the proper direction any desired degree of compression may be obtained.

Figure 6:
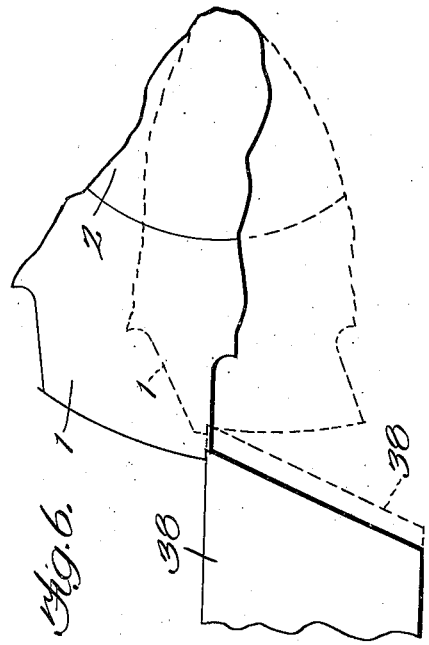
Fig. 6 is a diagrammatic view illustrating the action of the tool upon the work.

Operation: It will be evident that when the work is set up in the manner described, and the machine operated, an eccentric or spiral cut will be taken as illustrated in Fig. 6 and elsewhere. The tool moves inward automatically while the work is being rotated forward and moves backward automatically while the work is being rotated backward preparatory to taking a fresh cut. The general advance of the tool for taking the second cut will be effected by hand by rotating the feed screw 44. When one tooth of the hob has been entirely cut away the tool will be backed off by properly rotating the feed screw and the hob will be advanced one tooth by first retracting the dog 11, then rotating the index plate 16 forward and then permitting the dog to drop into the next notch. Thus the partial end teeth of the hob will be readily removed one after the other and the action of the machine during the removal of the tooth will be automatic except for the inward feeding of the tool at the end of each cut, which is accomplished by hand.

Having thus described my invention what I claim as new and desire to secure by Letters Patent, is:

1. A machine tool adapted to produce an eccentric surface, said machine having a work holder and a tool holder, means for oscillating one of them about an axis and simultaneously producing relative movement between the two in a radial direction at definite relative rates whereby the surface has a definite eccentricity or spiral when considered in a plane transverse to said axis and means for feeding the parts toward each other in a radial direction for enabling the tool to take a similar and deeper cut for each successive oscillation of the oscillating parts.

2. A machine tool adapted to produce an eccentric surface upon the work, said machine having a work holder adapted to oscillate about an axis, a tool holder, means for producing relative motion between the work holder and the tool holder in a direction at right angles to said axis in timed relation to thereby produce a surface of preordained eccentricity with respect to said axis in a plane at right angles thereto, and means whereby the tool holder and the work holder axis may be brought closer together after the completion of each oscillation of the work holder, for feeding purposes.

3. In a machine of the class described, a rocking work holder, a tool holder adapted to slide toward and from the axis of oscillation of the work, a lever for thus sliding the tool holder in synchronism with the movement of the work holder, a fulcrum for said lever, and means for changing the relative positions between the lever and its fulcrum to thereby vary the length of the stroke of the tool and consequently the eccentricity of the cut.

4. In a machine of the class described, a rocking work holder, a tool holder adapted to slide toward and from the work, a lever for thus sliding the tool holder in synchronism with the movement of the work holder, means for rocking the work holder, including an eccentric, and means for varying the throw of said eccentric to thereby vary the angle through which the work will rock.

5. A machine tool having an oscillating work holder, a tool holder adapted to reciprocate toward and from the work, a lever articulately connected to the tool holder for reciprocating it, and a fulcrum for said lever, movable toward and from the point of connection of the lever to the tool holder.

6. A machine tool having a stationary frame work, an oscillating work holder, a tool holder adapted to reciprocate toward and from the work, a lever articulately connected to the tool holder for reciprocating it, and a fulcrum for said lever, movable toward and from the point of connection of the lever to the tool holder, said fulcrum being slidable in the stationary frame work and being provided with means for adjustably holding it in fixed position.

7. A machine tool having an oscillating work holder, a tool holder adapted to reciprocate toward and from the work, a lever articulately connected to the tool holder for reciprocating it, a fulcrum for said lever, said fulcrum abutting said lever from one side only, and a spring for holding the lever in contact with its said fulcrum.

8. A machine tool having an oscillating work holder, a tool holder adapted to reciprocate toward and from the work, a lever articulately connected to the tool holder for reciprocating it, a fulcrum for said lever, said fulcrum abutting said lever from one side only, a spring for holding the lever in contact with its said fulcrum and means for varying the tension of the spring.

9. A hob trimming machine having a rotatable work holder for holding the hob, a slidable tool holder, a link for oscillating the work holder, a lever for reciprocating the tool holder, a drive shaft, and eccentric connections between the shaft and the link and the lever.

10. A hob trimming machine having a rotatable work holder for holding the hob, a slidable tool holder, a link for oscillating the work holder, a lever for reciprocating the tool holder, a drive shaft, eccentric connections between the shaft and the link and the lever, and means for varying the throw of one of said eccentric connections.

11. A machine tool having a tool holder, means for reciprocating it toward and from the work, a rotatable work holder, a link connected to the work holder for oscillating it, an eccentric for actuating said link in synchronism with the movement of the tool holder, and means for varying the point of connection of the link relatively to the tool holder.

12. A machine tool having a tool holder, a rotatable work holder, a link connected to the work holder at a point distant from its center for oscillating said work holder, the link extending approximately tangentially to the arc described by the point of connection of the link to the tool holder, means for adjusting the point of connection of the link to the tool holder in a direction approximately tangential to said arc, an eccentric for actuating said link back and forth approximately in the direction of its length to thereby oscillate the work holder, and means operating in synchronism with said eccentric for reciprocating the tool holder toward and from the work.

13. A machine for cutting off the end teeth of hobs, said machine having a spindle, a templet rigidly connected to the spindle concentric therewith, an arm adapted to oscillate back and forth upon an axis coincident with the produced axis of the hob, means for oscillating said arm, a tool holder, and means for sliding the tool holder toward and from the work in timed relation with the movement of the hob, said arm having a pawl, and the templet having notches for the reception of the pawl, and the number of notches being an even multiple of the number of teeth in the hob.

14. A machine tool having an oscillating work holder, a tool holder slidable toward and from the work, a feed screw connected to the tool holder for feeding the tool forward, a nut adapted to take said screw, a lever for reciprocating said nut, and means for actuating said lever and oscillating said tool holder in synchronism.

15. A machine tool having an oscillating work holder, a tool holder slidable toward and from the work, a feed screw connected to the tool holder for feeding the tool forward, a nut adapted to take said screw, a lever for reciprocating said nut, and means for actuating said lever and oscillating said tool holder in synchronism, the last mentioned means consisting of a shaft having two eccentrics, one for actuating the lever and the other articulately connected to the work holder.

16. A machine of the class described having a main frame, a drive shaft, an eccentric on said shaft, a slidable tool holder, a lever connected to said tool holder and actuated by said eccentric, a stationary fulcrum for said lever, a rockable work holder having an axis approximately at right angles to the direction of motion of the tool holder, a link for rocking the work holder, and a second eccentric on said shaft for actuating said link.

17. A machine of the class described having a main frame, a drive shaft, an eccentric on said shaft, a slidable tool holder, a lever connected to said tool holder and actuated by said eccentric, a stationary fulcrum for said lever, a rockable work holder, having an axis approximately at right angles to the direction of motion of the tool holder, a link for rocking the work holder, a second eccentric on said shaft for actuating said link, the fulcrum being in the form of a block adjustably located in the main frame and external to the lever, and means for holding the lever in contact with the fulcrum.

18. In a machine of the class described, the combination of a rocker arm, a coaxial index plate adjacent to it for advancing the work, said plate having notches in the periphery, the back of each notch having a radial inner portion and an oblique outer portion whereby either a step by step motion or an oscillatory motion may be obtained by selecting the proper form of detent for the rocker arm.

In witness whereof I have hereunto subscribed my name.

CARL G. OLSON.